(12) United States Patent
Smith, Jr. et al.

(10) Patent No.: US 9,523,044 B2
(45) Date of Patent: Dec. 20, 2016

(54) HYDROCARBON UPGRADING

(71) Applicant: ExxonMobil Chemical Patents Inc., Baytown, TX (US)

(72) Inventors: Rodney S. Smith, Jr., Edinburgh Midlothian (GB); Beshoy Abdelmalek, Seabrook, TX (US); Mark A. Nierode, Houston, TX (US); Michael Moran, Humble, TX (US); Derrick B. Callander, Humble, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 24 days.

(21) Appl. No.: 14/797,516

(22) Filed: Jul. 13, 2015

(65) Prior Publication Data

US 2016/0046874 A1 Feb. 18, 2016

Related U.S. Application Data

(60) Provisional application No. 62/037,834, filed on Aug. 15, 2014.

(51) Int. Cl.
*C10G 29/16* (2006.01)
*C10G 31/06* (2006.01)
*C01B 3/50* (2006.01)

(52) U.S. Cl.
CPC .............. *C10G 29/16* (2013.01); *C01B 3/506* (2013.01); *C10G 31/06* (2013.01); *C01B 2203/046* (2013.01); *C01B 2203/048* (2013.01)

(58) Field of Classification Search
CPC ....... C10G 29/16; C10G 31/06; C10G 70/046; C10G 70/043; C10G 70/02; B01D 53/04; C01B 3/02
See application file for complete search history.

(56) References Cited

U.S. PATENT DOCUMENTS

| | | | |
|---|---|---|---|
| 5,089,034 A * | 2/1992 | Markovs | B01D 53/04 95/123 |
| 5,785,739 A | 7/1998 | Baker | |
| 2012/0053383 A1 | 3/2012 | Malaty et al. | |
| 2015/0267131 A1* | 9/2015 | Iaccino | C10G 70/00 423/658.3 |

FOREIGN PATENT DOCUMENTS

| | | |
|---|---|---|
| GB | 1 142 339 | 2/1969 |
| WO | 2014/078153 | 5/2014 |

* cited by examiner

*Primary Examiner* — Sharon Pregler (57) ABSTRACT

The invention relates to hydrocarbon streams containing impurities such as carbon oxysulfides, to processes for upgrading the hydrocarbons by removing at least a portion of the impurities therefrom, to equipment useful in such processes, and to the use of upgraded hydrocarbons for, e.g., chemical manufacturing.

24 Claims, 2 Drawing Sheets

HYDROCARBON UPGRADING

CROSS-REFERENCE TO RELATED APPLICATIONS

This application is related to Provisional Application No. 62/037,834 filed Aug. 15, 2014, the disclosure of which is fully incorporated herein by reference.

FIELD OF THE INVENTION

The invention relates to hydrocarbon streams containing olefin and carbon oxysulfides, to processes for upgrading the hydrocarbons by removing at least a portion of the carbon oxysulfides, to equipment useful in such processes; and to the use of upgraded hydrocarbons for, e.g., chemical manufacturing.

BACKGROUND OF THE INVENTION

Hydrocarbon conversion processes such as catalytic cracking, pyrolysis, hydroprocessing, reforming, and the like can be utilized for producing conversion products comprising molecular hydrogen, saturated hydrocarbon (such as methane, ethane, propane, butane, etc.), and unsaturated hydrocarbon (e.g., ethylene, propylene, etc.). The mixtures generally contain undesirable compounds, such as hydrogen sulfide, carbon dioxide, water, and carbon oxysulfides, such as carbonyl sulfide ("COS"). It is generally desirable to separate ethylene and/or propylene from the conversion product, e.g., for storage and/or further processing, such as polymerization. In order to simplify this separation, at least a portion of the undesirable impurities are typically removed upstream of the ethylene and/or propylene separation. It is also typical to remove from the conversion product one or more of methane, $C_{4+}$ hydrocarbon, and molecular hydrogen, in order to increase ethylene and/or propylene purity.

For example, PCT Patent Application Publication No. WO2014/078153A1, which is incorporated by reference herein in its entirety, discloses utilizing successive fractionation stages for removing molecular hydrogen, methane, and $C_{4+}$ hydrocarbon from the conversion product. By exposing the conversion mixture to successively lower temperatures, hydrocarbon present in the conversion process can be separated by fractional distillation in sequential distillation stages, e.g., in one or more cryogenic distillation stages, such as in one or more cold boxes.

At least a vapor stream and a condensed stream are conducted away from the cold box. The vapor stream (a "tail gas") comprises methane and molecular hydrogen. The condensed stream comprises $C_{2+}$ hydrocarbon. Fractional distillation can be used for separating from the condensed stream one or more of a ($C_2+C_3$) hydrocarbon stream and a $C_{4+}$ hydrocarbon stream. Ethylene and/or propylene can be separated from the ($C_2+C_3$) hydrocarbon stream using conventional methods. It is generally desirable to separate molecular hydrogen from the tail gas, e.g., to increase the tail gas's methane concentration and to make molecular hydrogen available for other uses. It is conventional to use additional cold box stages to do this.

One difficulty encountered in separations carried out at cryogenic temperatures involves the accumulation of at least a portion of the undesirable compounds, such as COS, in the cold box or other low-temperature region of the process. The closeness of the COS and $C_3$ hydrocarbon boiling points leads to another difficulty, namely the presence of COS in condensed hydrocarbon streams containing $C_3$ hydrocarbons and/or mixtures of $C_2$ and $C_3$ hydrocarbons. Since cryogenic separation is cost-intensive, it is also generally desirable to make these stages as small as practical, e.g., to process the minimum amount of material necessary to obtain the desired ethylene and propylene products. For at least these reasons, it is conventional to remove at least a portion of any undesired impurities from the conversion product before the conversion product is exposed to sub-ambient temperatures in the cold box, as disclosed in the WO2014/078153A1 reference.

One way to remove carbon oxysulfides involves the use of a regenerable selective sorbent. When the conversion gas is conducted through a bed of regenerable selective sorbent operated in sorption mode, at least a portion of the carbon oxysulfides in the conversion gas remains in the bed. By selecting appropriate sorbents, bed configurations, and process conditions (temperature, pressure, flow rate, etc.), the concentration of carbon oxysulfides in the conversion product can be lessened to very low level, e.g., ≤1 part per million by mole (1 ppmm), per mole the conversion product. When the selective sorbent bed approaches its maximum capacity for the removal of carbon oxysulfides, the bed conditions are changed from sorption mode to regeneration mode, during which the bed's sorbent is regenerated. Regeneration is typically carried out by flowing tail gas through the bed at an elevated temperature to desorb the carbon oxysulfides, resulting in a tail gas enriched in carbon oxysulfides ("rich tail gas"). The process continues by changing the bed conditions to sorption mode, after regeneration is sufficiently completed, for additional removal of carbon oxysulfides from the conversion product.

The rich tail gas conducted away from the bed during regeneration mode can be used as fuel, e.g., for fueling one or more fired heater, such as firing steam cracking furnaces and/or other combustion equipment. Because the sorbent bed is utilized in sorption mode for a relatively long time period, with bed regeneration occurring during a significantly shorter period (regeneration mode), the rich tail gas has a significantly greater content of carbon oxysulfides than does the "lean" tail gas conducted to the bed during regeneration mode. This undesirably increases the furnace's flue gas sulfur content. It is desired to develop processes which lessen or avoid this difficulty.

SUMMARY OF THE INVENTION

Certain aspects of the invention relate to the development of a system, process, and apparatus for upgrading a hydrocarbon feed stream. The upgrading is carried out by exposing a feed stream containing carbon oxysulfides to cryogenic temperatures under conditions specified in this description and appended claims. The feed stream comprises (i) $C_3$ hydrocarbon, (ii) one or more of methane, $C_2$ hydrocarbon, and molecular hydrogen, and (iii) >0.1 ppmm of carbon oxysulfides per mole of the feed stream, wherein the feed stream includes ≥0.1 mole % of $C_{3-}$ unsaturates per mole of the feed stream. Exposing the feed stream to the specified conditions results in the condensation and separation of a raffinate comprising at least a portion of the feed stream's $C_3$ hydrocarbon and at least a portion of the feed stream's carbon oxysulfides. The raffinate's carbon oxysulfides are converted in a conversion stage by reacting the raffinate in the presence of at least one metal oxide, which (i) converts the metal oxide to its analogous metal sulfide and (ii) produces $CO_2$. At least 50.0% of the raffinate's carbon oxysulfides (molar basis, per mole of carbon oxysulfides in the raffinate) are converted in the conversion stage to produce a conversion product comprising $C_3$ hydrocarbon, carbon dioxide, and any remaining carbon oxysulfides. At least a portion of the conversion product's carbon dioxide is removed to produce an upgraded stream comprising ≥90.0% (molar basis) of $C_{3-}$ hydrocarbon. The upgraded stream typically has a carbon oxysulfides: $C_3$ hydrocarbon molar ratio≤0.5 and as little as ≤0.005 times times that of the feed stream.

It has surprisingly been found that the amount of carbon oxysulfides in the conversion stage's effluent is typically ≤20.0 ppmm (per mole of conversion stage effluent), e.g., ≤10.0 ppmm, such as ≤1.0 ppmm, or ≤0.1 ppmm. This is especially surprising because the process includes concentrating the feed stream's carbon oxysulfides in the raffinate.

The development of the process is based in part on the discovery that operating at least one cryogenic separation stage (e.g., at least one cold box stage) under conditions that include a temperature in the range of from −50° C. to −10° C. enables the removal from the feed of an extract comprising at least one of methane, $C_2$ hydrocarbons, and molecular hydrogen. The raffinate condenses in the cryogenic separation stage, but without appreciable accumulation in the stage of solid carbon oxysulfides that would, if present, interfere with raffinate condensation and separation. While not wishing to be bound by any theory or model, it is believed that the conditions specified in the cryogenic separation stage result in the condensing of carbon oxysulfides, but without lowering the vapor pressure of the condensed carbon oxysulfides beyond a point where they cannot be transferred away from the cryogenic separation stage with the liquid-phase raffinate. In particular, it is believed that the specified conditions lessen or substantially prevent the accumulation of COS in the cryogenic separation stage, e.g., as COS solids.

More particularly, the invention relates to a system, process, and apparatus for upgrading a feed stream, the feed stream comprising (i) $C_3$ hydrocarbon, (ii) one or more of methane, $C_2$ hydrocarbon, and molecular hydrogen, and (iii) >0.1 ppmm of carbon oxysulfides per mole of the feed stream, wherein the feed stream includes ≥0.1 mole % of $C_{3-}$ unsaturates per mole of the feed stream. The upgrading includes exposing at least a portion of the feed stream to a temperature in the range of from −50° C. to −10° C. to (i) extract from the exposed feed stream at least a portion of one or more of the methane, the $C_2$ hydrocarbons, and the molecular hydrogen and (ii) condense a raffinate comprising at least a portion of the exposed feed stream's $C_3$ hydrocarbon and at least a portion of the exposed feed stream's carbon oxysulfides. At least one active material is provided for converting the raffinate's carbon oxysulfides, the active material comprising at least one metal oxide. At least a portion of the raffinate is exposed to the active material in order to react it with at least a portion of the active material's metal oxide. This converts the metal oxide to an analogous metal sulfide and produces a conversion product comprising ≥90.0% (molar basis) of $C_{3-}$ hydrocarbon, ≤1.0 ppmm carbon oxysulfides, and ≥1.0 ppmm carbon dioxide. At least a portion of the conversion product's carbon dioxide is removed to produce an upgraded stream comprising ≥90.0% (molar basis) of $C_{3-}$ hydrocarbon, ≤0.5 ppmm carbon dioxide, and ≤1.0 ppmm carbon oxysulfides.

Certain aspects of the invention relate to an apparatus comprising An apparatus comprising at least one feed conduit for providing a feed stream; at least one cryogenic separation stage in fluid communication with at least one of the feed conduits, wherein at least a portion of the feed stream is exposed in the cryogenic separation stage to a temperature in the range of from −50° C. to −10° C.; and at least one reaction stage located downstream of the cryogenic separation stage. The reaction stage includes at least one active material. The active material comprises at least one metal oxide having activity for converting the carbon oxysulfides. The apparatus further comprises at least one conduit in fluid communication with the reaction stage and the cryogenic separation stage, and at least one carbon dioxide-removal stage in fluid communication with the reaction stage. At least a portion of the conversion product's carbon dioxide is removed in the carbon dioxide-removal stage to produce an upgraded stream. The apparatus further comprises at least one product conduit in fluid communication with the carbon dioxide-removal stage. The product conduct can be used for conducting away effluent from the carbon-dioxide removal stage.

Additional cryogenic stages can be used for condensing and separating at least a portion of the feed stream's $C_2$ hydrocarbon and/or a tail gas comprising at least a portion of the feed stream's methane. An extract comprising any molecular hydrogen can be conducted away.

DETAILED DESCRIPTION OF THE INVENTION

The invention relates to upgrading hydrocarbon-containing feed streams, particularly those comprising olefin and ≥0.1 ppmm carbon oxysulfides, per mole of the feed stream, e.g., ≥1.0 ppmm. Certain aspects of the invention are based on the discovery that the hydrocarbon stream can be processed to produce an upgraded stream by concentrating the carbon oxysulfides in a raffinate containing at least a portion of the feed stream's $C_3$ hydrocarbons. Typically, at least 50.0% of the feed stream's carbon oxysulfides (molar basis, per mole of carbon oxysulfides in the feed stream) are transferred from the feed stream to the raffinate. The process includes reacting at least a part of the raffinate in at least one conversion stage. The reacting is carried out in the presence of at least one metal oxide to convert ≥50.0 mole % of the of the raffinate's carbon oxysulfides (per mole of carbon oxysulfides in the raffinate) to metal sulfide and carbon dioxide. Effluent from the conversion stage comprises $C_3$ hydrocarbons and a molar amount of carbon oxysulfides per mole of effluent that is ≤0.5 times the molar amount of carbon oxysulfides per mole of feed stream, e.g., ≤0.1 times, such as ≤0.05 times, or ≤0.01 times, or ≤0.005 times. Beneficially, the upgraded stream can be produced at high space velocity and without increasing sulfur emissions resulting from the combustion of rich tail gas obtained from the upgrading process.

For the purpose of this description and appended claims, the following definitions will be utilized.

A "cold box" is a system of integrated heat exchangers and vapor liquid separators to produce at least (i) an extract rich in methane and molecular hydrogen ("$H_2$") and (ii) a raffinate rich in hydrocarbons having a number of carbon atoms greater than or equal to that of acetylene ($C_{2|}$). Temperatures ≤0° C. are "cryogenic" temperatures.

The term "carbon oxysulfides" means compounds containing (i) sulfur and (ii) carbon bound to oxygen by a double bond.

The term "tail gas" means a methane-containing stream derived from the feed stream in one or more cold box stages. Besides methane, tail gas typically contains molecular hydrogen, e.g., ≥50.0 wt. % methane and ≤50.0 wt. % molecular hydrogen, based on the weight of the tail gas. Tail gas can include methane-rich streams obtained in the course of purifying any molecular hydrogen derived from the cold box, including purifications by pressure swing adsorption and/or membrane separation.

The term "space velocity" means gas hourly space velocity ("GHSV"), where GHSV is equal to the volume of feed contacting a volume of active material per hour, the active material including one or more of catalyst, sorbent, etc. GHSV is calculated at STP (0° C. and 1 bar) from active material density (mass of active material per packed volume) and feed stream component amounts and densities.

The term "$C_n$" hydrocarbon wherein n is a positive integer, e.g., 1, 2, 3, 4, or 5, means hydrocarbon having n carbon atom(s) per molecule. The term "$C_{n+}$" hydrocarbon wherein n is a positive integer, e.g., 1, 2, 3, 4, or 5, means hydrocarbon having at least n carbon atom(s) per molecule. The term "$C_{n-}$" hydrocarbon wherein n is a positive integer, e.g., 1, 2, 3, 4, or 5, means hydrocarbon having no more than n number of carbon atom(s) per molecule. The term "hydrocarbon" means compounds containing hydrogen bound to carbon, and encompasses (i) saturated hydrocarbon, (ii) unsaturated hydrocarbon, and (iii) mixtures of hydrocarbons, including mixtures of hydrocarbons (saturated and/or unsaturated) having different values of n. The term "$C_n$ unsaturate" means a $C_n$ hydrocarbon containing at least one carbon atom directly bound to another carbon atom by a double or triple bond. The term "Periodic Table" means the Periodic Chart of the Elements, as it appears on the inside cover of The Merck Index, Twelfth Edition, Merck & Co., Inc., 1996.

Selected aspects of the invention where the feed stream's carbon oxysulfides are primarily COS will now be described in more detail. The invention is not limited to these aspects, and this description is not meant to foreclose other aspects/embodiments within the broader scope of the invention.

The Feed Stream

The feed stream comprises (i) $C_3$ hydrocarbon, e.g., ≥1% $C_3$ hydrocarbon, such as ≥5%; (ii) one or more of methane, $C_2$ hydrocarbon, and molecular hydrogen, and (iii) >0.1 ppmm of carbon oxysulfides per mole of the feed stream, wherein the feed stream includes ≥0.1% of $C_{3-}$ unsaturates. The percents are mole percents, per mole of the feed stream. Except where water content is expressly described, feed stream mole percents (including ppmw) are calculated on a "dry" basis, namely on a basis that excludes the amount of any water that may be present.

Besides these components, typical feed streams can further comprise molecular hydrogen, $C_{4+}$ hydrocarbon, molecular nitrogen, molecular oxygen, carbon dioxide, and water. For example, the feed stream can be a vapor saturated with water.

The feed streams can further comprise impurities, such as one or more of mercury, ammonia, $C_{4-}$ thiols, $NO_x$, methanol, carbon dioxide, hydrogen sulfide, arsines, carbon disulfide, dimethyl disulfide, mercaptans, thiophenes, cyanides, acetone, $C_{3-}$ alcohols, and aldehydes such as acetaldehyde. Such impurities, when present, are typically found in a concentration of ≤50 ppmm.

Typically, the feed streams comprise the following components, per mole of feed stream:

a. a total amount of $C_2$ hydrocarbons and $C_3$ hydrocarbons in the feed stream in the range of from 5.0 mole % to 80.0 mole %, per mole of feed stream, e.g., in the range of from 10 mole % to 60 mole %;

b. an amount of COS ≥0.5 ppmm, or ≥1.0 ppmm, or in the range of from 0.2 ppmm to 15.0 ppmm, or in the range of from 0.5 ppmm to 12.0 ppmm, or in the range of 1.0 ppmm to 10.0 ppmm;

c. an amount of $C_{4+}$ hydrocarbons in the range of from 0 to 40.0 mole %, e.g., in the range of from 1.0 mole % to 15.0 mole %;

d. an amount of methane in the range of from 0 to 50.0 wt. %, e.g., in the range of from 10.0 mole % to 60.0 mole %;

e. an amount of ethane in the range of from 0 to 20.0 mole %, e.g., in the range of from 1.0 mole % to 10.0 mole %;

f. an amount of ethylene in the range of about 0 to about 10.0 mole %, e.g., in the range of from 1.0 mole % to 8.0 mole %;

g. an amount of propane in the range of about 0.5 mole % to about 15 mole %, e.g., in the range of from 1.0 mole % to 10.0 mole %;

h. an amount of propylene in the range of about 0.5 mole % to about 60.0 mole %, e.g., in the range of from 1.0 mole % to 50 mole %, such as 2.0 mole % to 40.0 mole %;

i. an amount of molecular hydrogen in the range of 0 to 70 mole %, e.g., in the range of from 10 mole % to 60 mole %;

j. an amount of carbon dioxide ≤0.01 e.g., in the range of from 0.001 mole % to 0.01 mole %;

k. an amount of carbon monoxide in the range of from 0 to 5.0 mole %, e.g., in the range of from 0.1 mole % to 3.0 mole %;

l. an amount of oxygen in the range of from 0 to 4.0, e.g., in the range of from 0.1 mole % to 4.0 mole %;

m. an amount of nitrogen in the range of about 0 to about 40.0 mole %, e.g., in the range of from 0.2 mole % to 12.0 mole %;

n. an amount of methyl mercaptans in the range of about 0 to about 110.0 ppmm, e.g., in the range of 10.0 ppmm to 40.0 ppmm;

o. an amount of methanol in the range of 0 to about 750 ppmm, e.g., in the range of 15.0 ppmm to 40.0 ppmm; and p. an amount of dimethyl disulfide in the range of about 0 to about $1.0 \times 10^3$ ppmm, e.g., in the range of about 0.2 ppmm to 20.0 ppmm.

The feed stream can further comprise water, e.g., ≥5.0 wt. % of water, based on the weight of the feed stream, such as in the range of from about 20.0 wt. % to about 60.0 wt. % water. The feed stream can further comprise mercury, the mercury typically being present in an amount ≤50.0 parts per thousand (weight basis, based on the weight of the feed stream, "pptw"), e.g., in the range of from 1 pptw to 45 pptw.

The feed stream typically has a total $C_{2+}$ unsaturates content per mole of the feed stream of ≥2 mole %, e.g., ≥5 mole %, such as ≥10 mole %. In certain aspects, the feed stream has a total $C_{2+}$ unsaturates content per mole of the feed stream in the range of from 0.1 mole % to 70 mole %, e.g., 1 mole % to 50 mole %, such as 2 mole % to 30 mole %, or 2.5 mole % to 25 mole %. The unsaturates $C_{3-}$ unsaturates can be primarily $C_{3-}$ olefin. For example, the feed stream can have a total amount of $C_{3-}$ olefin content per mole of the feed stream that is ≥0.1 mole %, such as in the range of from 0.1 mole % to 70 mole %, or 1 mole % to 50 mole %, or 2 mole % to 30 mole %, or 2.5 mole % to 25 mole %. In certain aspects, ≥25.0% of the $C_{3-}$ olefin is propylene (molar basis, per mole of $C_{3-}$ olefin), e.g., ≥50.0%, such as ≥75.0%. Optionally, the feed stream comprises $C_{4+}$ olefin, e.g., ≥0.5% (molar basis, per mole of feed stream) $C_{4+}$ olefin, such as ≥1%.

The feed stream can be obtained, e.g., from one or more hydrocarbon separation, extraction, reaction, and/or conversion processes, such as one or more of catalytic cracking, pyrolysis, hydroprocessing, reforming, etc. Referring to this mixture as a "stream" is not meant to exclude other aspects within the broader scope of the invention, such as those where the mixture does not flow continuously, as might be the case in batch or semi-continuous processing. The feed stream can be provided to the upgrading process continuously, semi-continuously, or batch mode, depending on the configurations of the process equipment and separation systems utilized.

Certain aspects relating to removing COS and producing the upgraded stream will now be described in more detail. The invention is not limited to these aspects and this description is not meant to foreclose other aspects/embodiments for producing the upgraded stream within the broader scope of the invention.

Upgrading Process

The upgraded stream can be produced by removing from the feed stream at least a portion of (i) the $C_3$ hydrocarbon, (ii) the methane and/or the $C_2$ hydrocarbons, and (iii) the COS. Optionally, the process further comprises removing from the feed stream at least a portion of one or more of any (iv) $C_{4+}$ hydrocarbon, e.g., $C_{5+}$ hydrocarbon, (v) water, (vi) ammonia, (vii) methanol, (viii) mercury, and (ix) molecular hydrogen. Aspects of the process are advantageous for upgrading feed streams obtained from the cracking of hydrocarbons, particularly those cracking processes which produce a significant amount of COS. Optionally, the feed stream is subjected to initial processing, e.g., one or more pre-treatment steps, before removing olefin and COS. Such pre-treatments can include, e.g., one or more of selective hydrogenation, sulfur-compound removal, mercury removal, heavier hydrocarbon ($C_{6+}$) removal, water removal, mercury removal, tar removal, $CO_2$ removal, CO removal, etc. Conventional means can be utilized to do this, but the invention is not limited thereto. Conventional methods for removing acidic compounds such as $H_2S$ and $CO_2$ also exhibit some effectiveness for COS removal. It is observed, however, that when the feed stream contains COS and other acidic gases, conventional methods such as amine and/or caustic contacting do not remove sufficient COS.

The process typically includes exposing the feed stream to a first temperature ($T_1$) in a first cold box stage, under conditions sufficient to condense at least a portion (i) the feed stream's COS and (ii) the feed stream's $C_3$ hydrocarbon, in order to extract one or more of the feed stream's $C_{2-}$ hydrocarbons and/or the feed stream's molecular hydrogen. A first raffinate and a first extract are conducted away from the first cold box stage. The first raffinate comprises the condensed COS and condensed $C_3$ hydrocarbon, and any condensed $C_{4+}$ hydrocarbon that are not previously removed from the feed stream. The first extract comprises the uncondensed molecular hydrogen and/or uncondensed $C_{2-}$ hydrocarbons. Typically, ≥50.0% of the feed stream's COS (molar basis, per mole of COS in the feed stream) is transferred to the first raffinate, e.g., 75.0%, such as ≥90.0%.

When the first extract comprises (i) $C_2$ hydrocarbons and (ii) methane and/or molecular hydrogen, it can be desirable to expose the first extract to a second temperature ($T_2$). This can be carried out in a second stage of the cold box, under conditions sufficient to condense at least a portion of the first extract's $C_2$ hydrocarbons. A second raffinate and a second extract are conducted away from the second cold box stage. The second raffinate comprises at least a portion of the condensed $C_2$ hydrocarbons. The second extract comprises uncondensed methane and uncondensed molecular hydrogen. Those skilled in the art will appreciate that cryogenic separation is an imperfect process, and, consequently, some COS might be transferred to the first extract. As a result, process conditions in the second cold box stage are typically selected to lessen or substantially prevent accumulation in the cold box of the transferred COS, e.g., as accumulated solid COS. For example, conditions in the second cold box stage can include those which expose the first raffinate to a higher temperature than would otherwise be the case for efficiently extracting methane while condensing a raffinate comprising $C_2$ hydrocarbon and at least a portion of any residual COS. Operating this way produces a tail gas having a $C_2$ hydrocarbon content that is typically ≥0.1% (molar basis, per mole of tail gas), e.g., ≥0.5%, such as ≥1.0%, or ≥2.0%, or ≥5.0%. For example, the tail gas can have an ethylene content≥0.25% (molar basis, per mole of tail gas), e.g., ≥0.5%, such as ≥1.0%, or ≥2.0%, or ≥5.0%.

When the second extract comprises methane and molecular hydrogen, it can be desirable to expose the second extract to a third temperature ($T_3$). This can be carried out in a third stage of the cold box, under conditions sufficient to condense at least a portion of the second extract's methane. A tail gas comprising at least a portion of the condensed methane is conducted away. A hydrogen-containing stream, comprising the third extract's uncondensed molecular hydrogen, can be conducted away if desired.

Optionally, the cold box comprises additional stages upstream and/or downstream of stages 1-3. Stages upstream of the first cold box stage, when used, can be operated in ranges of temperature and pressure for condensing and separating one or more raffinates comprising $C_{4+}$ hydrocarbons. Stages downstream of the third cold box stage, when used, can be operated in ranges of temperature and pressure for condensing and separating additional methane from the third extract. At least a portion of the additional methane can be combined with the tail gas. The first and second raffinates can be combined to produce a COS-enriched hydrocarbon stream, which is conducted away from the cold box. Optionally, the COS-enriched hydrocarbon stream further comprises at least a portion of any $C_{4+}$ hydrocarbon that is condensed and separated in the first cold box stage or in stages upstream thereof.

The feed stream can be exposed to temperatures $T_1$, $T_2$, and $T_3$ in one or more cryogenic separation stages, e.g., one or more cold box stages. Cryogenic temperatures can be provided using conventional methods, such as by using one or more external refrigeration sources.

Cold box operating conditions typically include an average total pressure (averaged over all stages)≥1.0 bar absolute ("bar abs"), e.g., in the range of from 10.0 bar abs to 50 bar abs, e.g., 20 bar abs to 35 bar abs. Typically, $T_1$ is >$T_2$ and $T_2$>$T_3$. Use of one or more external refrigeration sources for cooling stage 800 is within the scope of the invention.

Optionally, the first cold box stage is operated under conditions which include (i) $T_1$ in the range of from −50° C.

to −10° C., e.g., in the range of from −45° C. to −15° C., such as in the range of −40° C. to −20° C.; and (ii) a total pressure in the range of from 10.0 bar abs to 50 bar abs, e.g., 20 bar abs to 35 bar abs. Desirably, the operating conditions of the first cold box stage can be selected in a pressure range and temperature range that (i) allows for first raffinate condensation and separation and (ii) substantially prevents COS solidification. In other words, conditions in the first cold box stage can be regulated so that COS and $C_3$ hydrocarbon condense, but remain in the liquid phase without significant COS solidification. Since ≥50.0 wt. % of the feed stream's COS is removed upstream of the second cold box stage, the second and third cold box stages can use temperatures and pressures that are efficient for condensing and separating $C_2$ hydrocarbons (in the second stage) and methane (in the third stage) while lessening or substantially preventing COS solidification in those stages. Optionally ≥50.0% of the feed stream's COS (molar basis, per mole of COS in the feed stream) is condensed and conducted away with the first raffinate at a location upstream of the second cold box stage, e.g., ≥75.0%, such as ≥90.0 wt. %, or in a range of 60% to 95%.

Optionally, the second cold box stage is operated under conditions which include (i) $T_2$ in the range of from −100° C. to −51° C., e.g., in the range of from −75° C. to −55° C.; and (ii) a total pressure in the range of from 10.0 bar abs to 50 bar abs, e.g., 20 bar abs to 35 bar abs.

Optionally, the third cold box stage is operated under conditions which include (i) $T_3$ in the range of from −200° C. to −101° C., e.g., in the range of from −150° C. to −110° C.; and (ii) a total pressure in the range of from 10.0 bar abs to 50 bar abs, e.g., 20 bar abs to 35 bar abs. Dividing a cold box stage into a plurality of regions, e.g., an upstream region and a downstream region, is within the scope of the invention. For example, the second cold box stage can be divided into upstream and downstream regions, the upstream region operating at a temperature $T_{2a}$ and the downstream region operating at a temperature $T_{2b}$, with $T_{2a} > T_{2b}$. For example, $T_{2a}$ can be in the range of −100° C. to −75° C., and $T_{2b}$ can be in the range of from −75° C. to −51° C.

Conventional methane-molecular hydrogen conditions can be used in cold box stages located downstream of the third cold box stage. Suitable conditions are disclosed in the WO2014-078153A1 reference, but the invention is not limited thereto.

The process continues by conducting the COS-enriched hydrocarbon stream to one or more additional separation stages for separating (i) a first mixture comprising carbon oxysulfides and $C_{3-}$ hydrocarbons and optionally (ii) a second mixture comprising any $C_{4+}$ hydrocarbons. The first mixture is conducted to a reaction stage where the carbon oxysulfides are reacted with one or more metal oxides to convert ≥50.0% (mole basis) of the first mixture's carbon oxysulfides. Effluent conducted away from the conversion stage comprises $C_3$ hydrocarbons, optionally $C_2$ hydrocarbons, carbon dioxide, and typically ≤0.1 ppmm of carbon oxysulfides, per mole of effluent. Propylene, and optionally ethylene, can be separated from the effluent, e.g., for storage or further processing, such as polymerization.

Certain aspects of the invention will now be described with reference to FIGS. 1 and 2. The invention is not limited to these aspects, and this description is not meant to foreclose any other embodiments within the broader scope of the invention.

A feed stream 100 obtained from one or more cracking processes. The feed stream comprises molecular hydrogen, methane, $C_2$ hydrocarbons, propane, ≥1.0 mole % propylene, and >1.0 ppmm of COS per mole of the feed stream (on a dry basis). As shown in FIG. 1, the feed stream is compressed in compressing stage 101 and conducted via conduits 102, 201, 301, and 401 to sequential pre-treatment stages 200, 300, and 400, which are utilized from removing from the feed stream at least a portion of any $CO_2$, $H_2S$, ammonia, methanol, mercury, etc. Undesired compounds, such as oxidants, particulates, $C_{6+}$ hydrocarbons (including tar) can be removed upstream of stage 101 (not shown). Conventional means can be utilized to do this, e.g., one or more filters, separators (e.g., knock-out drums) etc. The specified metal oxides utilized for removing the feed stream's carbon oxysulfides are sensitive to oxidants (which undesirably react with the analogous metal sulfide) and molecular hydrogen (which can reduce the metal oxide). It is therefore desirable to remove at least a portion of these compounds upstream of stage 101 or in one or more of the cryogenic separation stages 800. A portion of the feed stream's molecular hydrogen, when present, can be utilized in one or more acetylene converters for converting to ethylene at least a portion of any acetylene in the feed stream. Alternatively or in addition, molecular hydrogen from an external source can be used. Conventional acetylene conversion is suitable, and one or more acetylene conversion stages can be located upstream of stage 101.

Stage 200 can be utilized for contacting the first mixture with amine in order to remove at least a portion of the first mixture's hydrogen sulfide. Effluent conducted away from stage 200 is transferred to stage 300, in which the effluent of stage 200 is contacted with caustic in order to remove at least a portion of the feed stream's carbon dioxide, and at least a portion of any remaining hydrogen sulfide. Effluent from stage 300 can be conducted via conduit 301 to stage 400, where the effluent is washed with water to remove at least a portion of any residual amine and/or residual caustic conducted away from stages 200 and/or 300. Additional stages (not shown) can be utilized for removing from the feed stream at least a portion of any mercury that may be present. Conventional processing can be utilized in these pre-treatment stages, although the invention is not limited thereto.

Effluent from stage 400 typically comprises water, molecular hydrogen, methane, $C_2$ hydrocarbons, propane, ≥1.0 mole % propylene, and >1.0 ppmm of COS per mole of the feed stream (on a dry basis). Continuing with reference to FIG. 1, at least one stage for removing water and/or any $NO_x$ is located downstream of stage 400. In the aspects illustrated in FIG. 1, the water/$NO_x$ removal stage utilizes at least two vessels, 600 and 700. These vessels each contain at least two beds, an upstream bed (upstream being with respect to the flow of the first stream) comprising at least one water removal agent and a downstream bed comprising at least one $NO_x$ removal agent. The water removal agents and the $NO_x$ removal agents can be the same as those specified in PCT Patent Application Publication No. WO2014/078153A1, and can be operated under the conditions specified in that reference. Alternatively, in aspects not shown, at least one vessel is utilized for water removal and at least one vessel is utilized for $NO_x$ removal. Should $NO_x$ accumulate in the cold box, conventional methods can be used for $NO_x$ removal (including salts and/or gums thereof).

Figure 1:
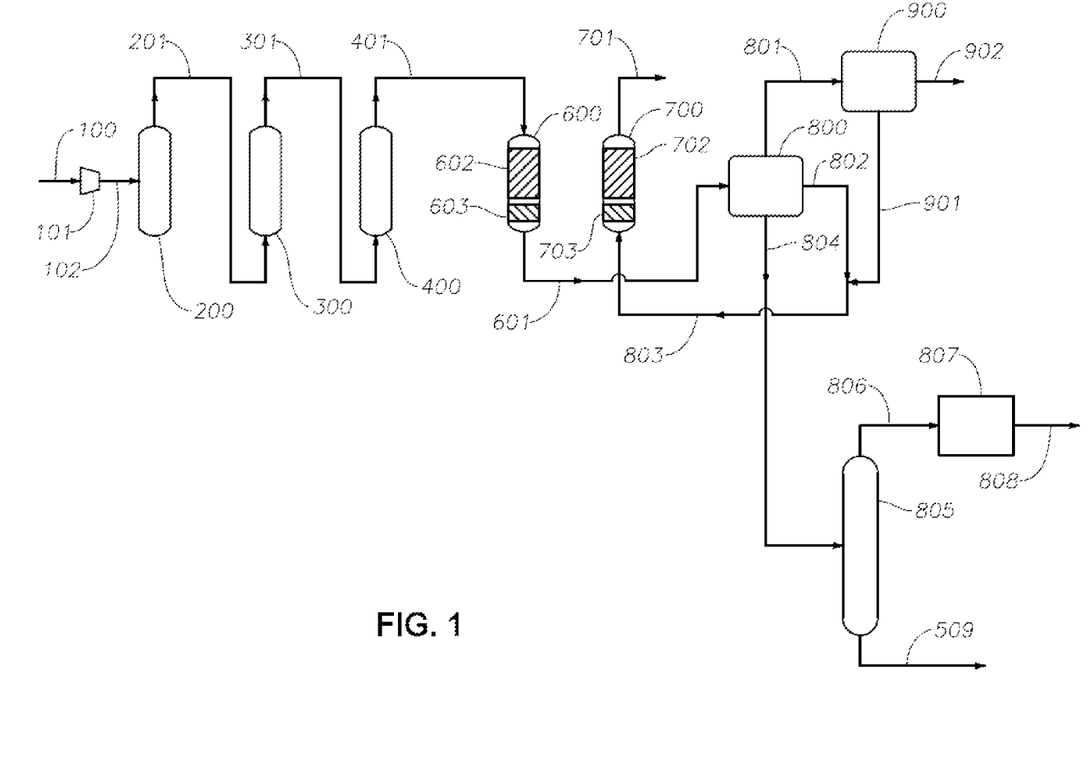
FIG. 1 schematically illustrates a process for upgrading a conversion product in accordance with the invention.
Figure 2:
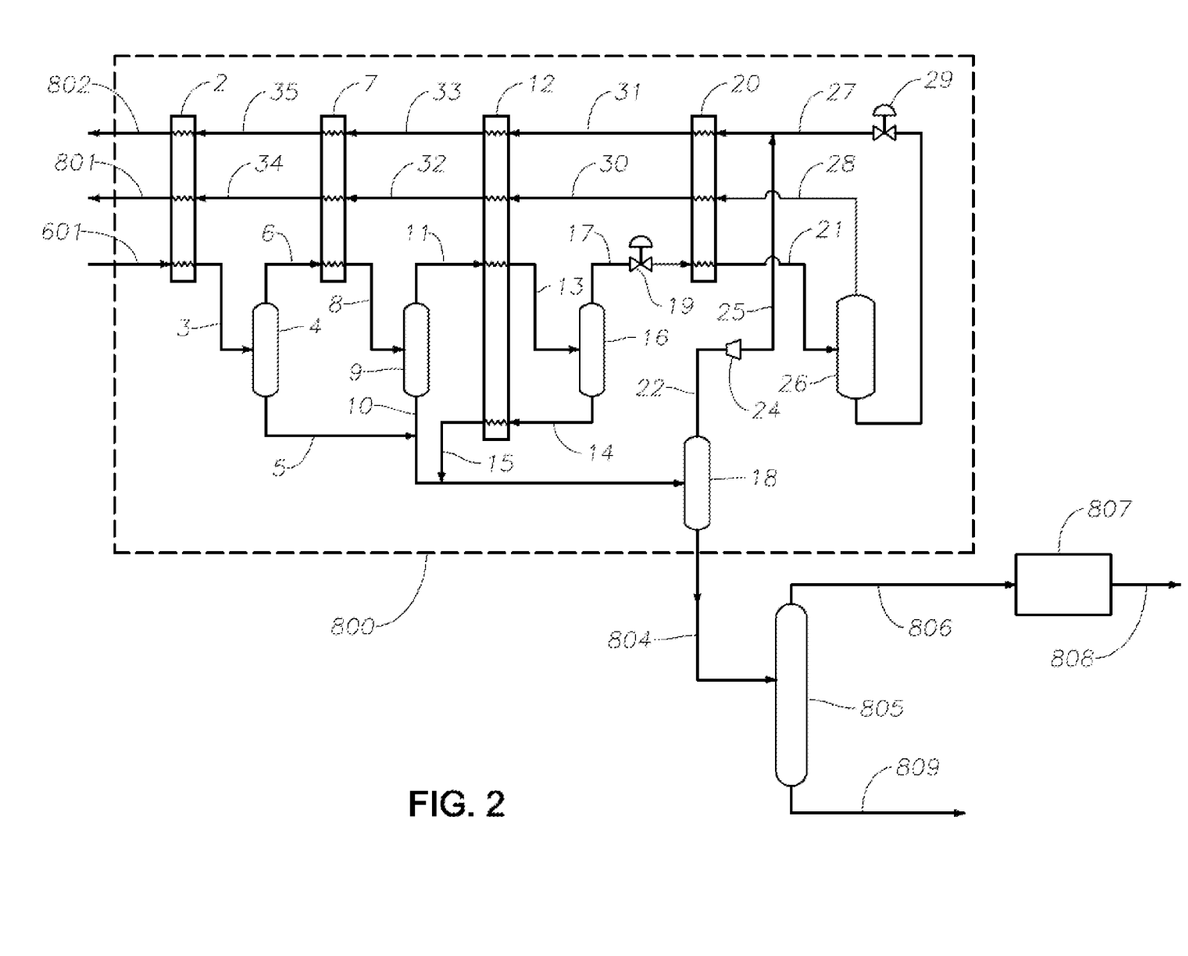
FIG. 2 schematically illustrates cryogenic separation stages for removing tail gas, molecular hydrogen, and condensed hydrocarbon, and stages for removing carbon oxysulfides from a stream comprising ethylene and/or propylene.

As shown in FIG. 1, a water removal agent of vessel 600 can be located in bed 602, and a $NO_x$ removal agent can be located in bed 603. Vessel 700 is substantially the same as vessel 600, with beds 702 and 703 containing substantially the same materials and being of substantially the same bed density as that of vessel 600. The vessels are operated in parallel, with vessel 600 operating in water/$NO_x$ removal mode, while vessel 700 undergoes regeneration in regeneration mode. Conventional water-removal agents and/or $NO_x$ removal agents can be utilized, e.g., one or more sorbents selective for removing water and/or $NO_x$. Conventional water-removal and $NO_x$-removal process conditions can be used. The invention is not limited to the use of these conventional technologies.

During regeneration mode, effluent from vessel 700 is conducted away via conduit 701. In sorption mode, effluent from vessel 600 (pre-treated feed stream) is conducted away via line 601 to a cryogenic separation stage 800. At least a portion of the pre-treated feed stream of line 601 is extracted in stage 800 and conducted away from stage 800 via line 801. A COS-enriched hydrocarbon stream is conducted away from stage 800 via line 804. Stage 800 can comprise, e.g., one or more cold boxes. Stage 800 will now be described in more detail with reference to FIG. 2.

Cryogenic separation stage 800 is utilized for separating from pre-treated feed stream and conducting away (i) a COS-enriched hydrocarbon stream, (ii) at least a portion of the pre-treated feed stream's molecular hydrogen, and (iii) at least a portion of the pre-treated feed stream's methane. The pre-treated feed stream which can be vapor phase (or mixed vapor-liquid phase) is conducted to a first heat exchanger 2, located in the first cold box stage. The pre-treated feed stream is exposed to temperature $T_1$ for cooling in the first cold box stage for cooling. The cooling is carried out by transferring heat from the pre-treated feed stream to tail gas (line 34) and molecular hydrogen (line 35). The cooled pre-treated feed stream is conducted away from heat exchanger 2 via line 3 to drum 4. The first raffinate is separated from the first extract, and is conducted away via line 5. The first extract is conducted away via line 6 to the upstream region of the second cold box stage, where it is exposed to a temperature $T_{2a}$.

The first extract is cooled in heat exchanger 7, located in the upstream region of the second cold box stage, by transferring heat from the first extract to tail gas (line 33) and molecular hydrogen (line 32). Cooled first extract is conducted away from heat exchanger 7 via line 8 to second drum 9. Condensed fluid (line 10) and vapor (line 11) are conducted away from drum 10. The vapor of line 11 is conducted to a downstream region of the second cold box stage, where it is exposed to a temperature $T_{2b}$. The vapor of line 11 is cooled in heat exchanger 12 by transferring heat from the vapor to tail gas (line 31) and molecular hydrogen (line 30). The cooled vapor is conducted away from heat exchanger 12 via line 13 to third drum 16. Condensed fluid (a first portion of the second raffinate) is conducted away from drum 16 via line 10, with vapor (the second extract) being conducted away via line 17.

The second extract is then conducted through valve 19 to heat exchanger 20, where second extract is exposed to temperature $T_3$ in a third cold box stage. The second extract is cooled by transferring heat from the second extract to tail gas (line 27) and molecular hydrogen (line 28). The cooled second extract is conducted away from heat exchanger 20 to drum 26, which is utilized for separating from the cooled second extract (i) condensed tail gas and (ii) vapor comprising primarily molecular hydrogen. The condensed tail gas is conducted away from drum 26 via line 27 to valve 29 where the pressure is reduced to provide refrigeration. The tail gas is then vaporized as it is conducted via lines 31, 33, and 35, through heat exchangers 20, 12, 7, and 2. Vaporized tail gas is conducted away via line 802. The molecular hydrogen stream (typically in the vapor phase) is conducted away from drum 26 via line 28, and is heated as it passes through heat exchangers 20, 12, 7, and 2 via lines 30, 32, and 34. The molecular hydrogen is conducted away via line 801.

The condensed fluid conducted away from drum 16 via line 16 can be conducted through heat exchanger 12, as shown. Downstream of heat exchanger 12, the condensed fluid of line 16 (a second portion of the second raffinate) is combined with the first portion of the second raffinate (line 10) to produce the second raffinate. The second raffinate is combined with the first raffinate to produce a combined raffinate. The raffinates can be combined in any order.

The combined raffinate is conducted to drum 18, for separating additional vapor (primarily methane). The additional vapor is conducted away via line 22, liquefied in stage 24 (e.g., a turbo expander), and then combined with the condensed tail gas of line 27 downstream of valve 29. Condensate conducted away from drum 18 via line 804 comprises the COS-enriched hydrocarbon stream.

The successive condensations effected by heat exchangers 2, 7, 12, and 20 and drums 4, 9, 16, and 26 generally result in exposing portions of the upgraded first stream to progressively lower temperatures, e.g., $T_1$ in heat exchanger 2, $T_{2a}$ in heat exchanger 7, $T_{2b}$ in heat exchanger 12, and $T_3$ in heat exchanger 20. Drums 4, 9, 16, and 26 can be located within or proximate to the cold box stages, as shown, but this is not required. In certain aspects, one or more of such drums is located away from the cold box stages.

Tail gas comprising, e.g., methane, is conducted away from stage 800 via line 802. Referring again to FIG. 1, molecular hydrogen obtained from stage 800 is optionally purified in purification stage 900, with the purified molecular hydrogen being conducted away via line 902. By-products of the purification, e.g., methane, can be conducted away from the purification stage via line 901, and optionally combined with the tail gas.

At least a portion of the tail gas is conducted via line 803 to vessel 700 for regenerating the removal agents of beds 702 and 703. Regeneration conditions include, e.g., a pressure in the range of 1 bar to 10 bar (absolute), such as 4 bar to 8 bar (absolute), and a temperature in the range of 100° C. to 400° C., such as 175° C. to 230° C. The products of the regeneration are conducted away via line 701. Valve means (not shown) can be utilized for switching vessel 600 to regeneration mode and vessel 700 to water/$NO_x$ removal mode.

Continuing with reference to FIG. 1, the COS-enriched hydrocarbon stream is conducted to stage 805, for separating first and second mixtures. When the feed stream of line 100 comprises COS, molecular hydrogen, methane, ethane, propane, ethylene, and propylene, the first mixture comprises ethylene, ethane, propylene, propane, ≥50.0% (molar basis) of the feed stream's COS, ≤10.0% (molar basis) of the feed stream's methane, and 10.0% (molar basis) of the feed stream's molecular hydrogen. Typically, the first mixture comprises ≥75.0% of the feed stream's COS, e.g., ≥90.0%; ≤1.0% of the feed stream's methane, e.g., ≤0.1%; and ≤1.0% of the feed stream's molecular hydrogen, e.g., ≤0.1%. For example, the first mixture can comprise ≥75.0% of $C_{3-}$ hydrocarbon (molar basis, per mole of first mixture), such as ≥90%, and ≥1.0 ppmm of COS (molar basis, per mole of first mixture), such as in the range of from 1.0 ppmm to 50 ppmm, or 9.0 ppmm to 25 ppmm. The second mixture comprises at least a portion of any $C_{4+}$ hydrocarbon present in the COS-enriched hydrocarbon stream. When operating the cryogenic separation stage under the specified conditions when using the specified feed streams, the amount of molecular hydrogen in the first mixture is typically ≤100.0 ppmm, e.g., ≤10.0 ppmm, such as ≤1.0 ppmm, and the amount of oxidant in the first mixture is typically ≤100.0 ppmm, e.g., ≤10.0 ppmm, such as ≤1.0 ppmm, per mole of first mixture.

The first mixture is conducted via conduit 806 to stage 807, which is utilized for removing COS. Additional stages located downstream of stage 807 (not shown) can be utilized for removing at least a portion of any by-products of COS conversion, typically carbon dioxide, and for removing (i) any acetylene and/or (ii) any $C_{3-}$ paraffin as might be present in the COS-enriched hydrocarbon stream conducted to stage 807. An upgraded stream, comprising propylene and optionally one or more of ethylene, ethane, and/or propane, is conducted away via line 808. The upgraded stream can be conducted away, e.g., for storage and/or further processing, such as polymerizing one or more of the upgraded stream's $C_{3-}$ olefins. Stage 807 will now be described in more detail.

The first mixture is reacted in stage 807 in the presence of at least one bed of one or more active materials containing metal oxides. The metal oxides can be composites of metal oxide and a refractory support or binder, e.g., silica and/or alumina. Typically, the active material contains ≥1.0 wt. %, based on the weight of the active material, of oxide(s) of at least one metal selected from Groups 1, 3, 7-12, and 14 of the Periodic Table. For example, the active material can include oxide(s) of one or more of zinc, cadmium, cobalt, nickel, copper, iron, lead, manganese, silver, gold, scandium, and lithium. In certain aspects, the active material comprises (i) copper oxide, (ii) nickel oxide, and (iii) an alumina support. For example, the active material can comprise 10.0 wt. % to 90.0 wt. % metal oxide and 90.0 wt. % to 10.0 wt. % of alumina support, based on the weight of the active material. The nickel oxide:copper oxide mass ratio can be in the range of from 1 to 2. Optionally, the active material has an average pore diameter in the range of from about 50 Å to about 100 Å, and a surface area≥100 $m^2/g$.

Stage 807 can be operated in the vapor phase, liquid phase, or in a mixed phase. Typically, stage 807 is operated in the liquid phase, at a temperature in the range of from about 20° C. to about 60° C., a pressure on the range of from about 10 bar abs to about 45 bar abs, and a GHSV≥200 $hr^{-1}$, such as ≥300 $hr^{-1}$. Suitable active materials and process conditions are disclosed in British Patent No. 1,142,339, which is incorporated by reference herein in its entirety.

Typically, the active material is non-regenerable, i.e., when the active material is exposed to COS under the specified conditions, the metal oxides are irreversibly converted to the equivalent metal sulfides. The term "irreversible" in this context means that exposing the spent metal sulfide to a temperature sufficient to desorb sulfur would result in decomposing the active material. Accordingly, when the bed of conversion stage 807 exhibits COS breakthrough, the bed is removed from service for replacement of the spent active material with fresh active material. If desired, metals can be recovered from the spent active materials for re-use, e.g., for producing fresh active material. Suitable non-regenerable active materials and the use thereof for COS removal are disclosed in GPA Research Report No. 991, R. B. Rhinesmith, et al., Jun. 11, 2001, which is incorporated by reference herein in its entirety.

It is believed that exposing the first mixture's COS to the active material of stage 807 results in (i) the conversion of the active material's metal oxide to its analogous metal sulfide and (ii) the production of carbon dioxide). Typically, ≥50.0% of the first mixture's COS (molar basis, per mole of COS in the first mixture) is converted in stage 807, e.g., ≥75.0%, such as ≥90.0%, or ≥95.0%, or ≥99.0%, or ≥99.5%.

The conversion product typically comprises ≤1.0 ppmm of COS (per mole of conversion product), e.g., ≤0.5 ppmm, such as ≤0.1 ppmm, or ≤0.05 ppmm. The conversion product (the effluent of stage 807) typically contains a stoichiometric amount of $CO_2$, based on the number of moles of COS converted in stage 807, e.g., ≥1.0 ppmm $CO_2$. The $CO_2$ can be removed by conventional means, such as by contacting the conversion product with one or more beds of sorbent that is active for removing $CO_2$ ("$CO_2$ sorbent"). Conventional $CO_2$ sorbents can be utilized, such as the regenerable $CO_2$ sorbents disclosed in U.S. Pat. No. 5,089,034, which is incorporated by reference herein in its entirety. When the $CO_2$ sorbents approach or exceed their capacity for $CO_2$ removal, the sorbents can be regenerated by conventional methods, such as sweeping the sorbents with methane and/or molecular hydrogen, these being obtained from one or more external sources. When typical feed streams comprising methane, ethylene, and $C_3$ hydrocarbons are used, the tail gas of line 802 typically has an ethylene content≥0.25% (molar basis, per mole of tail gas) when cryogenic separation stage 800 is operated under the specified conditions. In these aspects, unlike conventional processes for separating $CO_2$ and light olefin, tail gas is generally not suitable for $CO_2$ desorption, and molecular hydrogen (obtained, e.g., from line 801 and/or an external source) can be used instead.

The upgraded stream is conducted away from the $CO_2$ sorption stage. The upgraded stream typically contains ≥90% $C_{3-}$ hydrocarbons (molar basis), e.g., ≥95%; ≤1.0 ppmm of COS, e.g., ≤0.5 ppmm, such as ≤0.1 ppmm, or ≤0.05 ppmm; and ≤1.0 ppmm of $CO_2$, e.g., ≤0.5 ppmm, such as ≤0.1 ppmm, or ≤0.05 ppmm. The upgraded stream typically has a carbon oxysulfide:$C_3$ hydrocarbon molar ratio that is no more than 0.5 times that of the feed stream, e.g., ≤0.1 times, such as ≤0.05 times, or ≤0.01 times, or ≤0.005 times.

In locations having facilities for olefin purification and recovery, such as locations having one or more steam cracking systems, the upgraded stream can be conducted to such olefin purification and recovery facilities to produce additional $C_{3-}$ olefin. The $C_{3-}$ olefin can be polymerized to produce polymer containing units derived from the additional propylene and/or the additional ethylene, which polymerization facilities are frequently proximate to steam cracking facilities.

The invention produces an upgraded olefin-containing stream, and lessens or substantially avoids certain difficulties encountered in the prior art processes. In aspects of the invention which include utilizing a non-regenerable sorbent for removing carbon oxysulfides downstream of cryogenic separation, the amount of sulfur released during the regeneration of regenerable sorbents upstream of cryogenic separation can be significantly reduced. Besides this improvement, the invention is also an improvement over the catalytic removal of carbon oxysulfides upstream of cryogenic separation. For example, exposing the specified feed stream to a hydrolysis catalyst is observed to convert carbon oxysulfides to hydrogen sulfide and carbon dioxide, but catalyst lifetime is impractically brief. While not wishing to be bound by any theory or model, it is believed that the observed rapidity of hydrolysis catalyst deactivation results from the presence of olefin in the feed stream. It is also found that when operating under certain conditions, the product of the catalytic hydrolysis reaction contains $C_{1+}$ mercaptans, which are particularly undesirable. Certain aspects of the invention lessen or substantially avoid these difficulties by using a non-regenerable sorbent for removing at least a portion of the feed stream's carbon oxysulfides downstream of cryogenic separation.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" to mean at least the components and/or steps listed thereafter. Likewise, whenever a composition, an element or a group of elements is preceded with the transitional phrase "comprising", it is understood that we also contemplate the same composition or group of elements with transitional phrases "consisting essentially of," "consisting of", "selected from the group consisting of," or "is" preceding the recitation of the composition, element, or elements and vice versa.

The invention claimed is:

1. A hydrocarbon upgrading process, comprising:
   (a) providing a feed stream, the feed stream comprising (i) $C_3$ hydrocarbon, (ii) one or more of methane, $C_2$ hydrocarbon, and molecular hydrogen, and (iii) >1.0 ppmm of carbon oxysulfides per mole of the feed stream, wherein the feed stream includes ≥0.1 mole % of $C_{3-}$ unsaturates per mole of the feed stream;
   (b) exposing at least a portion of the feed stream to a temperature in the range of from −50° C. to −10° C. to (i) extract from the exposed feed stream at least a portion of one or more of the methane, the $C_2$ hydrocarbons, and the molecular hydrogen and (ii) condense a first raffinate comprising at least a portion of the exposed feed stream's $C_3$ hydrocarbon and at least a portion of the exposed feed stream's carbon oxysulfides;
   (c) exposing the extract of step (b) to a second temperature to produce a second extract and to condense a second raffinate, and (ii) exposing the second extract to a third temperature to produce a condensed tail gas, and an uncondensed third extract, wherein the second temperature is in the range of from −100° C. to −51° C., the third temperature is in the range of from −200° C. to −101° C.,
   (d) providing at least one active material, the active material comprising at least one metal oxide having activity for converting carbon oxysulfides;
   (e) exposing at least a portion of the first raffinate and a portion of the second raffinate to the active material to react >50% (molar basis) of the exposed raffinate's carbon oxysulfides with at least a portion of the active material's metal oxide to (i) convert the reacted metal oxide to an analogous metal sulfide and (ii) produce a conversion product comprising $C_3$ hydrocarbon, any unconverted carbon oxysulfides, and carbon dioxide; and
   (f) removing at least a portion of the conversion product's carbon dioxide to produce an upgraded stream comprising >90.0% (molar basis) of $C_{3-}$ hydrocarbon.

2. The process of claim 1, wherein the carbon oxysulfides comprise ≥90.0% (molar basis) carbonyl sulfide, and wherein the feed stream comprises ≥0.5 ppmm carbonyl sulfide.

3. The process of claim 1, wherein the carbon oxysulfides comprise ≥99.0% (molar basis) carbonyl sulfide, and wherein feed stream comprises a total amount of 10.0% to 60.0% (molar basis) methane, 5.0% to 80.0% (molar basis) total $C_2$ hydrocarbons and $C_3$ hydrocarbons, 1.0 ppmm to 10.0 ppmm of carbonyl sulfide, 1.0% to 15.0% $C_{4+}$ hydrocarbons; 0.1% to 70% (molar basis) $C_{3-}$ olefin, and 10% to 60% molecular hydrogen.

4. The process of any of claim 1, wherein the feed stream further comprises ≥5.0 wt. % of water, based on the weight of the feed stream.

5. The process of any of claim 1, wherein step (b) is carried out in at least one cold box stage, and wherein the temperature is in the range of −45° C. to −15° C.

6. The process of any of claim 1, wherein
   the second raffinate comprises $C_2$ hydrocarbon,
   the condensed tail gas comprises methane and >0.25% ethylene (molar basis, per mole of tail gas); and
   the third extract comprises molecular hydrogen vapor.

7. The process of any of claim 1, wherein the active material comprises ≥1.0 wt. % of oxide(s) of at least one metal selected from Groups 1, 3, 7-12, and 14 of the Periodic Table, based on the weight of the active material.

8. The process of any of claim 1, wherein the active material comprises ≥1.0 wt. % of copper oxide and/or nickel oxide, and the process further comprises recovering copper and/or zinc from the metal sulfide.

9. The process of any of claim 1, wherein the process further comprises removing from the conversion product at least a portion of any $C_{4+}$ hydrocarbon.

10. The process of any of claim 1, wherein ≥95.0% of the exposed first raffinate is reacted in step (d), and wherein the upgraded stream contains ≥95% $C_{3-}$ hydrocarbon (molar basis); ≤1.0 ppmm of COS, and ≤1.0 ppmm of $CO_2$.

11. A hydrocarbon upgrading process, comprising:
    (a) providing a feed stream, the feed stream comprising (i) $C_3$ hydrocarbon, (ii) one or more of methane, $C_2$ hydrocarbon, and molecular hydrogen, and (iii) >1.0 ppmm of carbon oxysulfides per mole of the feed stream, wherein the feed stream includes ≥0.1 mole % of $C_{3-}$ unsaturates per mole of the feed stream;
    (b) exposing at least a portion of the feed stream to a temperature in the range of from −50° C. to −10° C. to (i) extract from the exposed feed stream at least a portion of one or more of the methane, the $C_2$ hydrocarbons, and the molecular hydrogen and (ii) condense a first raffinate comprising at least a portion of the exposed feed stream's $C_3$ hydrocarbon and at least a portion of the exposed feed stream's carbon oxysulfides;
    (c) exposing the extract of step (b) to a second temperature to produce a second extract and to condense a second raffinate, and (ii) exposing the second extract to a third temperature to produce a condensed tail gas, and an uncondensed third extract, wherein the second temperature is in the range of from −100° C. to −51° C., the third temperature is in the range of from −200° C. to −101° C.,
    (d) providing at least one active material, the active material comprising at least one metal oxide having activity for converting carbon oxysulfides;
    (e) exposing at least a portion of the first raffinate and a portion of the second raffinate to the active material to react at least a portion of the exposed raffinate's carbon oxysulfides with at least a portion of the active material's metal oxide to (i) convert the reacted metal oxide to an analogous metal sulfide and (ii) produce a conversion product comprising ≥90.0% (molar basis) of $C_{3-}$ hydrocarbon, ≤1.0 ppmm carbon oxysulfides, and ≥1.0 ppmm carbon dioxide; and (f) removing at least a portion of the conversion product's carbon dioxide to produce an upgraded stream comprising ≥90.0% (molar basis) of $C_{3-}$ hydrocarbon, ≤0.5 ppmm carbon dioxide, and ≤1.0 ppmm carbon oxysulfides.

12. The process of claim 11, wherein the carbon oxysulfides comprise ≥90.0% (molar basis) carbonyl sulfide, and wherein the feed stream comprises ≥0.5 ppmm carbonyl sulfide.

13. The process of claim 11, wherein the carbon oxysulfides comprise ≥99.0% (molar basis) carbonyl sulfide, and wherein feed stream comprises a total amount of 10.0% to 60.0% (molar basis) methane, 5.0% to 80.0% (molar basis) total $C_2$ hydrocarbons and $C_3$ hydrocarbons, 1.0 ppmm to 10.0 ppmm of carbonyl sulfide, 1.0% to 15.0% $C_{4+}$ hydrocarbons; 0.1% to 70% (molar basis) $C_{3-}$ olefin, and 10% to 60% molecular hydrogen.

14. The process of any of claim 11, wherein the feed stream further comprises ≥5.0 wt. % of water, based on the weight of the feed stream.

15. The process of any of claim 11, wherein step (b) is carried out in at least one cold box stage, and wherein the temperature is in the range of −45° C. to −15° C.

16. The process of any of claim 11, wherein
the second raffinate comprises C2 hydrocarbon,
the condensed tail gas comprises methane and ≥0.25% ethylene (molar basis, per mole of tail gas); and
the third extract comprises molecular hydrogen vapor.

17. The process of any of claim 11, wherein the active material comprises ≥1.0 wt. % of oxide(s) of at least one metal selected from Groups 1, 3, 7-12, and 14 of the Periodic Table, based on the weight of the active material.

18. The process of any of claim 11, wherein the active material comprises ≥1.0 wt. % of copper oxide and/or nickel oxide, and the process further comprises recovering copper and/or zinc from the metal sulfide.

19. The process of any of claim 11, wherein the process further comprises removing from the conversion product at least a portion of any $C_{4+}$ hydrocarbon.

20. A hydrocarbon upgrading process, comprising:
(a) providing a feed stream, the feed stream comprising methane, ≥1 mole % $C_2$ hydrocarbon, ≥1 mole % $C_3$ hydrocarbon, molecular hydrogen, and >1.0 ppmm of carbon oxysulfides per mole of the feed stream, wherein the feed stream includes ≥0.1 mole % of $C_{3-}$ unsaturates per mole of the feed stream;
(b) exposing at least a portion of the feed stream to a temperature in the range of from −50° C. to −10° C. to (i) extract from the exposed feed stream at least a portion of one or more of the methane, the $C_2$ hydrocarbons, and the molecular hydrogen and (ii) condense a first raffinate comprising at least a portion of the exposed feed stream's $C_3$ hydrocarbon and at least a portion of the exposed feed stream's carbon oxysulfides;

(c) exposing the extract of step (b) to a second temperature to produce a second extract and to condense a second raffinate, and (ii) exposing the second extract to a third temperature to produce a condensed tail gas, and an uncondensed third extract, wherein the second temperature is in the range of from −100° C. to −51° C., the third temperature is in the range of from −200° C. to −101° C., (d) providing at least one active material, the active material comprising at least one metal oxide having activity for converting carbon oxysulfides;

(e) exposing at least a portion of the first raffinate and a portion of the second raffinate to the active material to react ≥95% (molar basis) of the exposed raffinate's carbon oxysulfides with at least a portion of the active material's metal oxide to (i) convert the reacted metal oxide to an analogous metal sulfide and (ii) produce a conversion product comprising ≥90.0% (molar basis) of $C_{3-}$ hydrocarbon and ≥1.0 ppmm carbon dioxide; and (e) removing at least a portion of the conversion product's carbon dioxide to produce an upgraded stream comprising ≥90.0% (molar basis) of $C_{3-}$ hydrocarbon, ≤0.5 ppmm carbon dioxide, and having a carbon oxysulfide: C3 hydrocarbon molar ratio that is no more than 0.5 times that of the feed stream.

21. The process of claim 20, wherein the carbon oxysulfides comprise ≥90.0% (molar basis) carbonyl sulfide, and wherein the feed stream comprises ≥0.5 ppmm carbonyl sulfide.

22. The process of claim 20, wherein the carbon oxysulfides comprise ≥99.0% (molar basis) carbonyl sulfide, and wherein feed stream comprises a total amount of 10.0% to 60.0% (molar basis) methane, 5.0% to 80.0% (molar basis) total $C_2$ hydrocarbons and $C_3$ hydrocarbons, 1.0 ppmm to 10.0 ppmm of carbonyl sulfide, 1.0% to 15.0% $C_{4+}$ hydrocarbons; 1 mole % to 50 mole % (molar basis) $C_{3-}$ olefin, and 10% to 60% molecular hydrogen.

23. The process of any of claim 20, wherein the feed stream further comprises ≥5.0 wt. % of water, based on the weight of the feed stream.

24. The process of any of claim 20, wherein ≥99.0% of the exposed first raffinate is reacted in step (d), and wherein the upgraded stream contains ≥95% $C_{3-}$ hydrocarbons (molar basis); ≤0.1 ppmm of COS, and ≤1.0 ppmm of $CO_2$.

* * * * *